(12) United States Patent
Choi (10) Patent No.: US 10,960,739 B2
(45) Date of Patent: Mar. 30, 2021

(54) REINFORCEMENT STRUCTURE FOR B-PILLARLESS OPPOSITE SLIDING DOORS

(71) Applicants: Hyundai Motor Company, Seoul (KR); Kia Motors Corporation, Seoul (KR)

(72) Inventor: Je-Won Choi, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 45 days.

(21) Appl. No.: 16/406,953

(22) Filed: May 8, 2019

(65) Prior Publication Data
US 2020/0217111 A1    Jul. 9, 2020

(51) Int. Cl.
| | | |
|---|---|---|
| *B60J 5/04* | (2006.01) | |
| *B60J 5/06* | (2006.01) | |
| *E05B 83/38* | (2014.01) | |
| *E05C 21/00* | (2006.01) | |
| *E05C 19/00* | (2006.01) | |

(52) U.S. Cl.
CPC ............. *B60J 5/0479* (2013.01); *B60J 5/043* (2013.01); *B60J 5/0427* (2013.01); *B60J 5/06* (2013.01); *E05B 83/38* (2013.01); *E05C 19/005* (2013.01); *E05C 21/00* (2013.01)

(58) Field of Classification Search
CPC ... B60J 5/0479; B60J 5/06; B60J 5/043; B60J 5/0427
USPC .............................................. 296/155, 146.6
See application file for complete search history.

(56) References Cited

U.S. PATENT DOCUMENTS

| | | | |
|---|---|---|---|
| 2014/0077523 A1* | 3/2014 | Choi ...................... | B60J 5/0479 296/146.9 |
| 2016/0129769 A1* | 5/2016 | Choi ...................... | E05C 3/124 49/120 |
| 2019/0135349 A1* | 5/2019 | Nusier ...................... | B60J 5/06 |
| 2020/0283069 A1* | 9/2020 | Choi ...................... | B21D 53/88 |

* cited by examiner

*Primary Examiner* — Jason S Morrow
(74) *Attorney, Agent, or Firm* — Morgan, Lewis & Bockius LLP (57) ABSTRACT

A rigidity reinforcing structure for B-pillarless opposite sliding doors may include a column impact beam which is vertically mounted at one side of the door to support the door in an up-down direction of a vehicle; a center rail which is horizontally mounted at a center portion of the door to support the door in a front-rear direction of the vehicle and allows the door to slide; and a lower impact beam which is horizontally mounted at a lower side of the door to support the door in the front-rear rear direction and has one end portion where an intersection portion between the lower impact beam and the column impact beam is formed.

16 Claims, 13 Drawing Sheets

SECT d-d

Section e-e

REINFORCEMENT STRUCTURE FOR B-PILLARLESS OPPOSITE SLIDING DOORS

CROSS-REFERENCE TO RELATED APPLICATIONS

The present application claims priority to Korean Patent Application No. 10-2019-0001273, filed on Jan. 4, 2019, the entire contents of which is incorporated herein for all purposes by this reference.

BACKGROUND OF THE INVENTION

Field of the Invention

The present invention relates to a reinforcement structure for B-pillarless opposite sliding doors, and particularly, to a reinforcement structure for opposite sliding doors which enables the doors to slide while preventing a deterioration in rigidity of the doors in the event of a broadside collision even though a B pillar is omitted and the doors are configured to slide in opposite directions.

Description of Related Art

In general, an impact beam, which absorbs impact energy occurring in the event of a broadside collision of a vehicle, is horizontally disposed in a door of the vehicle. In the event of a broadside collision, the impact beam absorbs impact energy by being crushed, reducing impact which may be transmitted to an occupant.

Both end portions of the impact beam may be fixed to an internal panel of the door by a support bracket. A reinforcing bracket may be attached to a middle portion of the impact beam by $CO_2$ welding or the like to solve a problem of buckling of the impact beam in the event of a broadside collision.

In this regard, the related art may include a sliding door apparatus configured for a vehicle which may include a center rail which is mounted on a door and extends straight, a center slider which is coupled to the center rail and movable along the center rail, a lower rail which is mounted on a vehicle body and extends straight, and a lower slider which is coupled to the lower rail and movable along the lower rail.

However, generally, if a B pillar is omitted from the vehicle body, there is no component for supporting a structure of the vehicle in an up-down direction of the vehicle, and as a result, there is a problem in that rigidity of the door and roof crush resistance deteriorate in the event of a broadside collision.

Generally, there is a problem in that bending stiffness of the door deteriorates because no upper rail is included, the door is supported at two points, that is, on the roller and the lower rail, and the center rail is supported only at a portion coupled to the roller.

Generally, there a problem in that the number of components is increased and costs are increased because an organic relationship between the impact beam and a member for allowing the door to slide is not considered.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a structure in which a column impact beam is vertically mounted on a door, such that a deterioration in rigidity of the door in the event of a broadside collision is prevented, a deterioration in roof crush resistance is prevented, the column impact beam is connected to a center rail mounted on the door to allow the door to slide, the column impact beam is configured to intersect a lower impact beam mounted horizontally at a lower side of the door, and thus the two-point support structure in the related art is reinforced, even in a case in which B-pillarless opposite sliding doors are configured to slide in opposite directions and a B pillar is omitted from an impact beam structure in the related art.

Various aspects of the present invention are directed to providing a rigidity reinforcing structure for B-pillarless opposite sliding doors, the rigidity reinforcing structure including: a column impact beam which is vertically mounted at one side of the door to support the door in an up-down direction of a vehicle; a center rail which is horizontally mounted at a center portion of the door to support the door in a front-rear direction of the vehicle and allows the door to slide; and a lower impact beam which is horizontally mounted at a lower side of the door to support the door in the front-rear direction and has one end portion where an intersection portion between the lower impact beam and the column impact beam is formed.

One side of the center rail may be coupled to a center bracket which is mounted on the door while overlapping the column impact beam, and the other side of the center rail may be coupled to a roller which is mounted on a vehicle body to correspond to the center rail and allows the door to slide while supporting the center rail.

The rigidity reinforcing structure may further include an upper bracket which is formed at an upper side of the column impact beam to accommodate the column impact beam and mounted on the door while overlapping the column impact beam.

The upper bracket may be coupled to an upper latch which is configured to lock or unlock the door and the vehicle body.

The intersection portion may further include: a lower column bracket which is formed to accommodate a lower portion of the column impact beam and coupled to the door while overlapping the column impact beam; and a lower bracket which is formed to accommodate the lower impact beam and coupled to the door while overlapping the lower impact beam.

The lower impact beam, the lower column bracket, the lower bracket, and the column impact beam may overlap one another at the intersection portion and may be mounted on the door.

The lower impact beam may be formed such that the intersection portion is compressed flat, and the lower impact beam may be coupled to the lower bracket.

The rigidity reinforcing structure may further include an internal belt rail which is horizontally mounted at a center portion of the door to support the door in the front-rear direction of the vehicle and has one end portion which is bent such that the internal belt rail is mounted on the door while overlapping the column impact beam and the center bracket.

The internal belt rail may be mounted on the door while overlapping a mounted portion of the center rail.

According to an exemplary embodiment of the present invention having the aforementioned configuration, the column impact beam is vertically mounted on the door, and as a result, there is an advantage in that it is possible to improve collision rigidity of the B pillarless opposite sliding doors in the event of a broadside collision and to increase roof crush resistance.

According to an exemplary embodiment of the present invention, the center rail mounted on the door is not externally exposed when the door is opened or closed, and as a result, there is an advantage in that marketability is improved.

According to an exemplary embodiment of the present invention, there is an advantage in that the center rail horizontally mounted on the door allows the door to slide and reinforces horizontal rigidity of the door.

According to present invention, the roller is mounted at one side of the center rail, and the center bracket, which is mounted on the door while overlapping the column impact beam, is coupled at the other side of the center rail, and as a result, there is an advantage in that a support structure of the center rail is reinforced.

According to an exemplary embodiment of the present invention, the upper latch is coupled to the upper portion of the column impact beam, and as a result, there is an advantage in that coupling strength between the door and the vehicle body is increased and the door is prevented from being opened in the event of a broadside collision.

According to an exemplary embodiment of the present invention, the lower impact beam for horizontally supporting the lower portion of the door and the column impact beam for vertically supporting the door intersect and overlap each other, and the lower impact beam and the column impact beam are coupled to the door, and as a result, there is an advantage in that connection rigidity is increased.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the accompanying drawings. However, the present invention is not restricted or limited by exemplary embodiments. Like reference numerals indicated in the respective drawings refer to members which perform substantially the same functions.

A framework reinforcing structure for B-pillarless opposite sliding doors according to an exemplary embodiment of the present invention refers to a structure which is mounted on doors 1 of a vehicle to ensure collision rigidity in the event of a broadside collision, ensure bending stiffness of the doors 1 which prevents deflective deformation that occurs when the doors 1 sag downward, and ensure roof crush resistance which prevents collapse of a roof.

Figure 1:
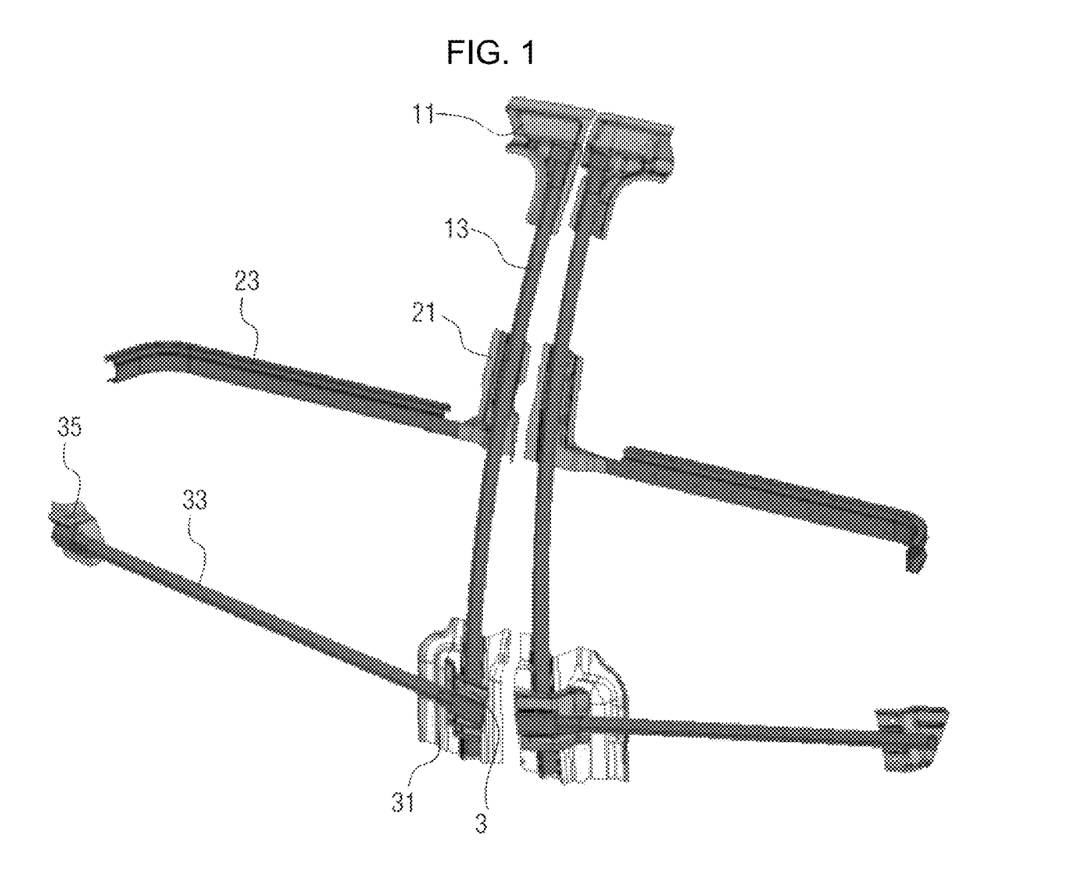
FIG. 1 is a view exemplarily illustrating a framework reinforcing structure for B-pillarless opposite sliding doors according to an exemplary embodiment of the present invention.
Figure 2:
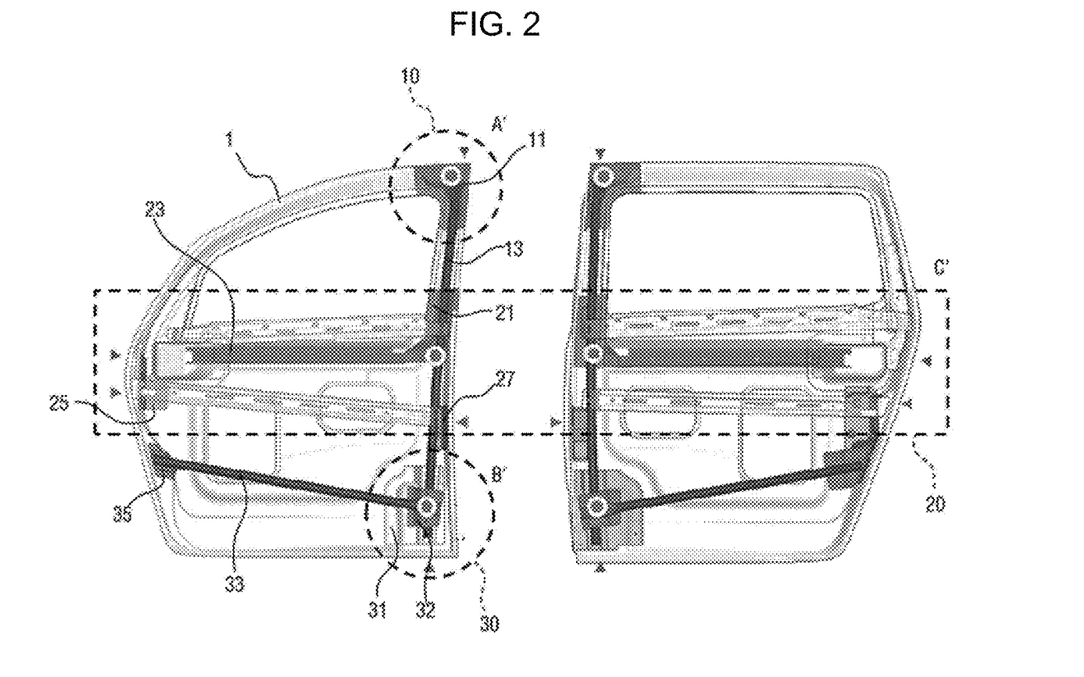
FIG. 2 is a view exemplarily illustrating a state in which the framework reinforcing structures for B-pillarless opposite sliding doors according to an exemplary embodiment of the present invention are mounted on doors.

FIG. 1 is a view exemplarily illustrating the framework reinforcing structure for B-pillarless opposite sliding doors according to an exemplary embodiment of the present invention, and FIG. 2 is a view exemplarily illustrating a state in which the framework reinforcing structures for B-pillarless opposite sliding doors according to an exemplary embodiment of the present invention are mounted on the doors 1.

Referring to FIG. 1 and FIG. 2, the framework reinforcing structure for B-pillarless opposite sliding doors according to an exemplary embodiment of the present invention may include column impact beams 13 which are vertically disposed, and center rails 23 and lower impact beams 33 which are horizontally disposed.

The column impact beam 13 may be vertically mounted at one side of the door 1 to support the door 1 in an up-down direction of the vehicle.

In the case of a B-pillarless vehicle configured such that a B pillar is omitted from a vehicle body 2 in the related art and the doors 1 (front and rear doors) are configured to come into contact with each other when the doors are closed, the column impact beams 13 are mounted on portions of the front and rear doors which are adjacent to each other, respectively, such that the column impact beams 13 may be substituted for the B pillar and may ensure collision rigidity and roof crush resistance.

Since the column impact beams 13 are mounted, it is possible to increase collision rigidity in the event of a broadside collision when the doors 1 are closed and the vehicle travels, and it is possible to prevent collapse of the roof in the event of an accident because the column impact beams 13 support the doors 1 in the up-down direction and also support the roof of the vehicle.

The column impact beam 13 may further include an upper bracket 11 at an upper side thereof. The upper bracket 11 may be formed to accommodate the column impact beam 13 and may be mounted on the door 1 while overlapping the column impact beam 13.

The upper bracket 11 may have a recessed portion corresponding to the column impact beam 13, such that the upper bracket 11 may be coupled to the column impact beam 13 by welding. Alternatively, the upper bracket 11 may be formed such that the column impact beam 13 is inserted into the upper bracket 11, and the upper bracket 11 may be mounted on the door 1.

Since the column impact beam 13 is mounted on the door 1 in the state in which the column impact beam 13 is accommodated in and overlaps the upper bracket 11, it is possible to ensure connection rigidity therebetween.

The center rail 23 may be horizontally mounted on the door 1 and at a center portion of the door 1 to support the door 1 in a front-rear direction of the vehicle.

A roller may be coupled to the center rail 23 to allow the door 1 to slide. The center rails 23 may be mounted on the front and rear doors, respectively, to allow the doors 1 to be opened or closed in opposite directions.

The sliding door 1 in the related art has a problem in that the center rail 23 is mounted on the vehicle body 2 and the center rail 23 is externally exposed when the door 1 is closed. However, since the center rail 23 is mounted on the door 1, it is possible to prevent the center rail 23 from being exposed to the outside, and it is possible to ensure rigidity of the door 1.

A center bracket 21, which is mounted on the door 1 while overlapping the column impact beam 13, may be coupled to the center rail 23, such that the center rail 23 may be mounted on the door 1. The present configuration will be described in detail below.

The lower impact beam 33 may be mounted at a lower side of the door 1. The lower impact beam 33 may be horizontally mounted to support the door 1 in the front-rear direction thereof by a lower bracket 35 and a lower bracket 32, and an intersection portion 30 between the lower impact beam 33 and the column impact beam 13 may be positioned at one end portion of the lower impact beam 33.

A main latch coupling unit 25 to which a main latch is coupled may be formed between the center rail 23 and the lower impact beam 33. A center latch coupling unit 27 to which a center latch is coupled may be formed between the center rail 23 and the lower impact beam 33. The main latch coupling unit 25 and the center latch coupling unit 27 may allow the door 1 and the vehicle body 2 to be locked when the door 1 is closed.

Figure 3A:
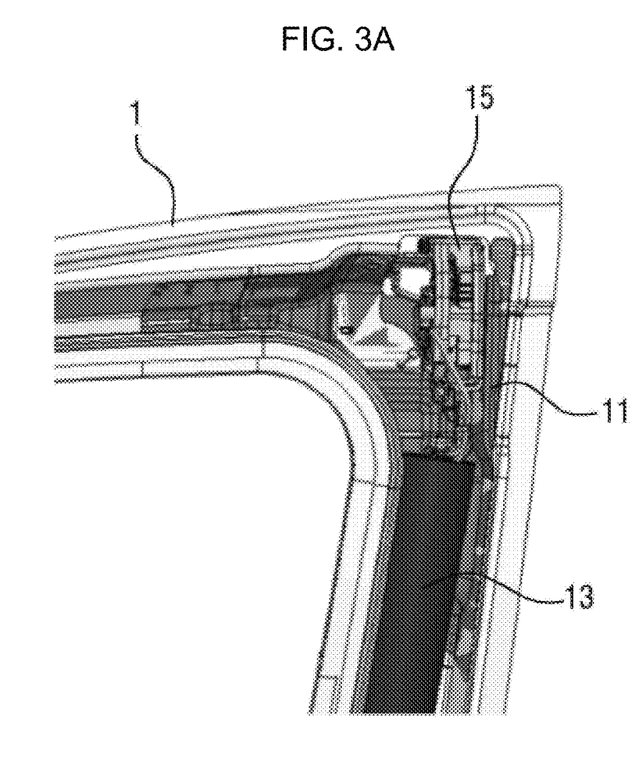
FIG. 3A is an enlarged front view of portion A' in FIG. 2.
Figure 3B:
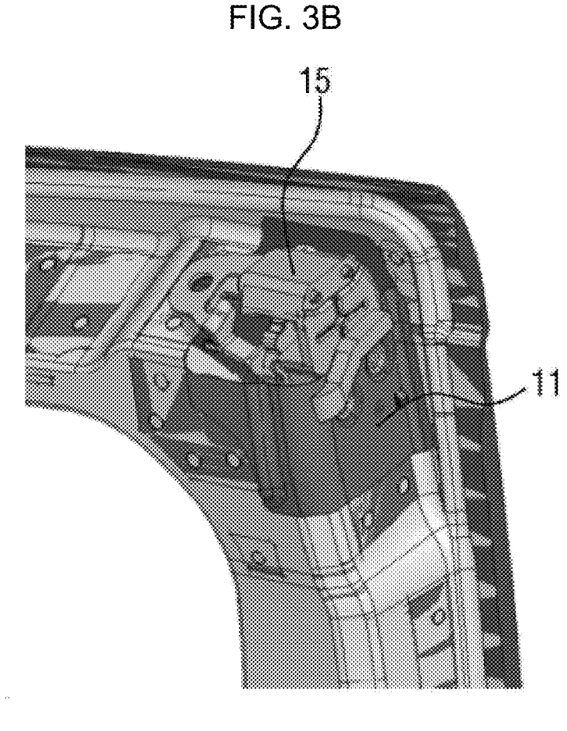
FIG. 3B is an enlarged perspective view of portion A' in FIG. 2.

FIG. 3A is an enlarged front view of portion A' in FIG. 2, and FIG. 3B is an enlarged perspective view of portion N in FIG. 2.

Referring to FIG. 3, an upper latch 15, which is configured to lock or unlock the door 1 and the vehicle body 2, may be coupled to the upper bracket 11.

The column impact beam 13 may be coupled to the upper bracket 11, and the upper bracket 11 is coupled to the upper latch 15 which locks the door 1 and the vehicle body 2 when the door 1 is closed, such that coupling rigidity between the door 1 and the vehicle body 2 may be ensured.

Figure 4:
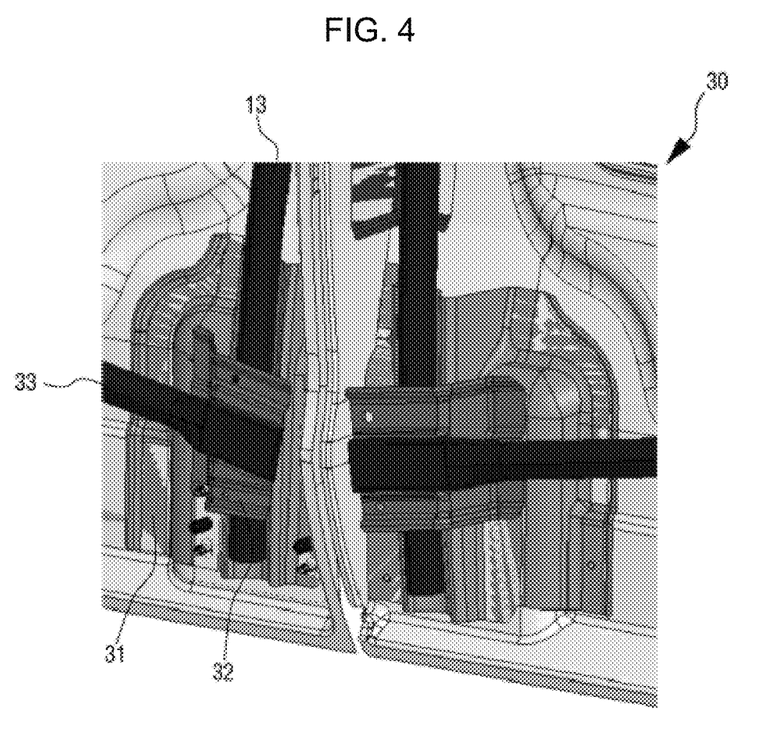
FIG. 4 is an enlarged perspective view of portion B' in FIG. 2.

FIG. 4 is an enlarged perspective view of portion B' in FIG. 2.

The intersection portion 30 may further include a lower column bracket 31 which is formed to accommodate the column impact beam 13 and coupled to the door 1 while overlapping the column impact beam 13, and a lower bracket 32 which is formed to accommodate the lower impact beam 33 and coupled to the door 1 while overlapping the lower impact beam 33.

The lower column bracket 31 and the lower bracket 32 may be coupled to the column impact beam 13 and the lower impact beam 33 by welding, respectively. Alternatively, the column impact beam 13 may be inserted into and coupled to the lower column bracket 31, and the lower impact beam 33 may be inserted into and coupled to the lower bracket 32.

Therefore, the lower impact beam 33, the lower column bracket 31, the lower bracket 32, and the column impact beam 13 overlap and are coupled, by welding, to one another at the intersection portion 30 and mounted on the door 1, and as a result, it is possible to ensure rigidity of the intersection portion 30.

The lower column bracket 31 vertically accommodates the column impact beam 13, and the lower bracket 32 horizontally accommodates the lower impact beam 33, and as a result, it is possible to ensure rigidity in both vertical and horizontal directions.

Figure 5A:
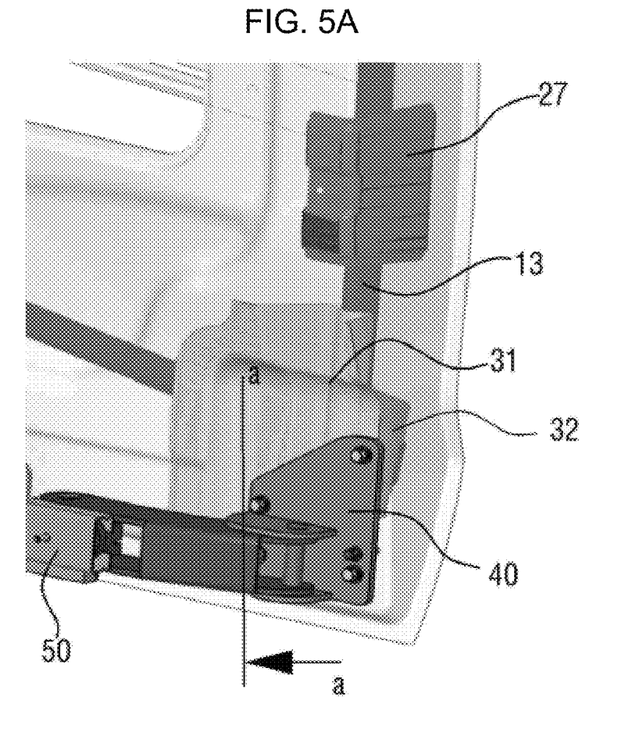
FIG. 5A is a perspective view exemplarily illustrating a lower roller mounted on portion B' and a lower rail coupled to the lower roller.

FIG. 5A is a perspective view exemplarily illustrating a lower roller 40 mounted on portion B' and a lower rail 50 coupled to the lower roller 40.

Referring to FIG. 5A, the lower roller 40 may be mounted at the lower side of the door 1 to allow the door 1 to slide, and the lower roller 40 may be coupled to the lower rail 50 mounted on the vehicle body 2.

Figure 5B:
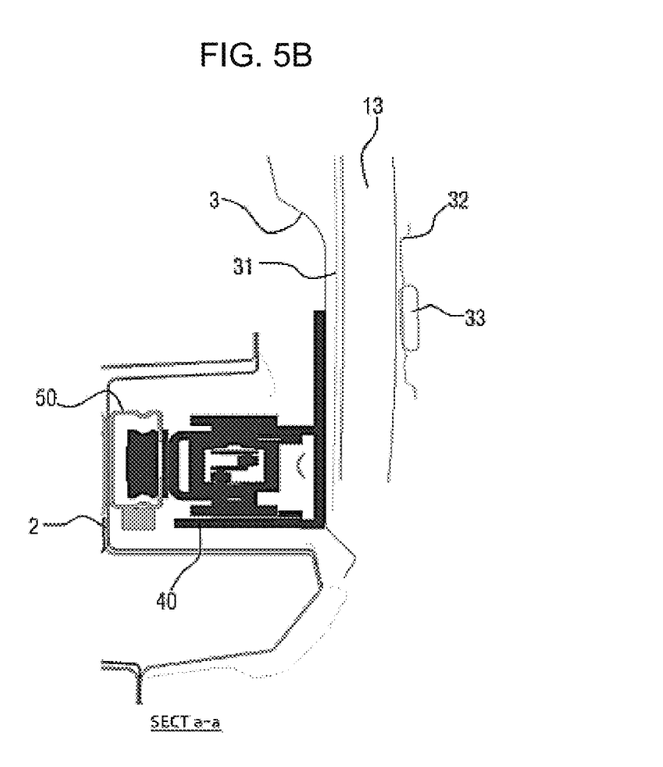
FIG. 5B is a cross-sectional view exemplarily illustrating section a-a in FIG. 5A.

FIG. 5B is a cross-sectional view exemplarily illustrating section a-a in FIG. 5A.

Referring to FIG. 5B, the lower impact beam 33, the lower bracket 32, the column impact beam 13, and the lower column bracket 31 may overlap one another and may be mounted on one surface of a door panel 3, and the lower roller 40 may be mounted on the other surface of the door panel 3.

In the instant case, since the lower impact beam 33, the lower bracket 32, the column impact beam 13, and the lower column bracket 31 overlap one another, it is possible to ensure rigidity of a coupled portion of the lower roller 40.

Figure 6A:
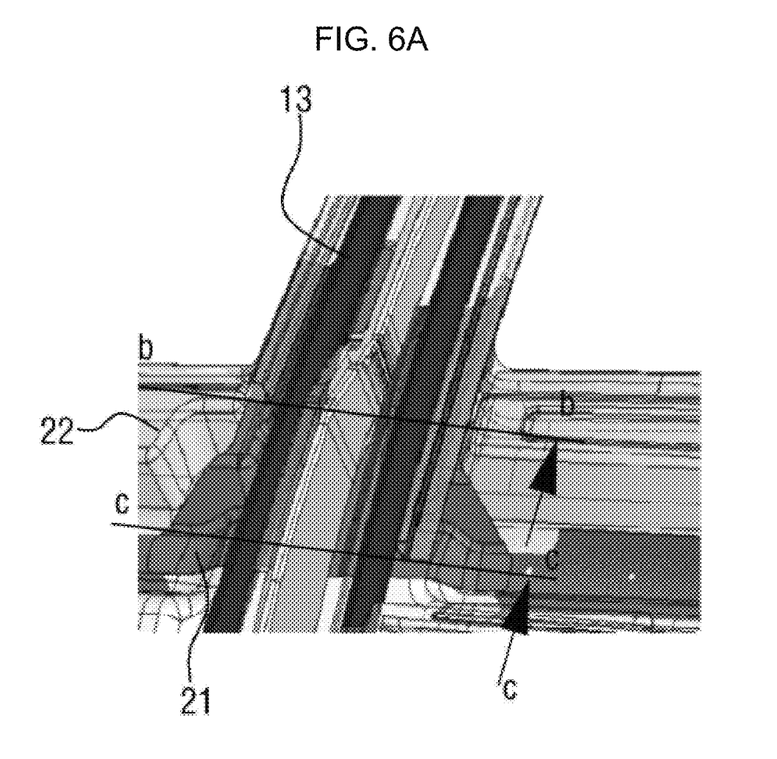
FIG. 6A is a perspective view exemplarily illustrating a column impact beam, a center bracket, a center rail, and an internal belt rail according to an exemplary embodiment of the present invention which are mounted on the door.

FIG. 6A is a perspective view exemplarily illustrating the column impact beam 13, the center bracket 21, the center rail 23, and the internal belt rail 22 according to an exemplary embodiment of the present invention which are mounted on the door 1.

Referring to FIG. 6A, like the upper bracket 11, the center bracket 21 may have a recessed portion corresponding to the column impact beam 13, such that the center bracket 21 may be coupled to the column impact beam 13 by welding. Alternatively, the center bracket 21 may be formed such that the column impact beam 13 is inserted into the center bracket 21, and the center bracket 21 may be mounted on the door 1.

Since the column impact beam 13 is mounted on the door 1 in the state in which the column impact beam 13 is accommodated in and overlaps the center bracket 21, it is possible to ensure connection rigidity therebetween.

Figure 6B:
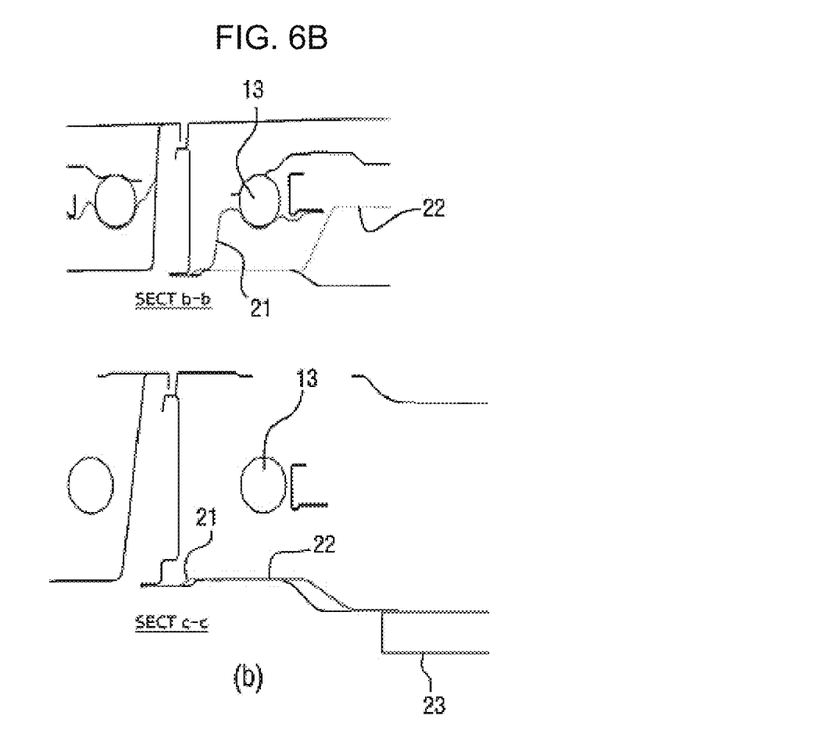
FIG. 6B is a cross-sectional view exemplarily illustrating section b-b and section c-c in FIG. 6A.

FIG. 6B is a cross-sectional view exemplarily illustrating section b-b and section c-c in FIG. 6A.

Referring to FIG. 6B, the rigidity reinforcing structure for the B-pillarless opposite sliding doors 1 according to an exemplary embodiment of the present invention may further include an internal belt rail 22 which is horizontally mounted at the center portion of the door 1 to support the door 1 in the front-rear direction of the vehicle. One end portion of the internal belt rail 22 is bent so that the internal belt rail 22 is mounted on the door 1 while overlapping the column impact beam 13 and the center bracket 21.

Since the column impact beam 13, the center bracket 21, and the internal belt rail 22 overlap one another and are coupled to the door 1, it is possible to ensure rigidity of the door 1.

Figure 7A:
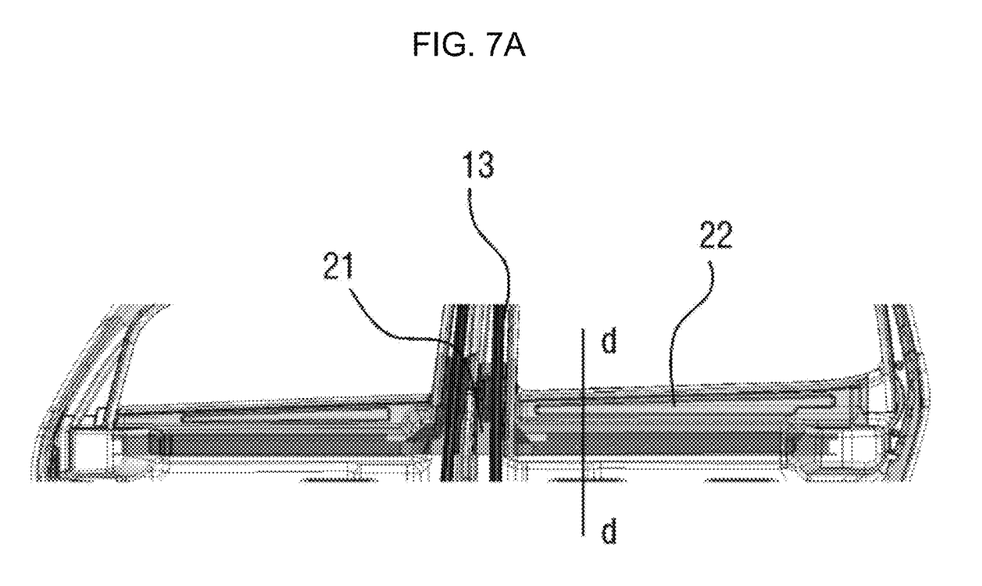
FIG. 7A is an enlarged front view of portion C' in FIG. 2.
Figure 7B:
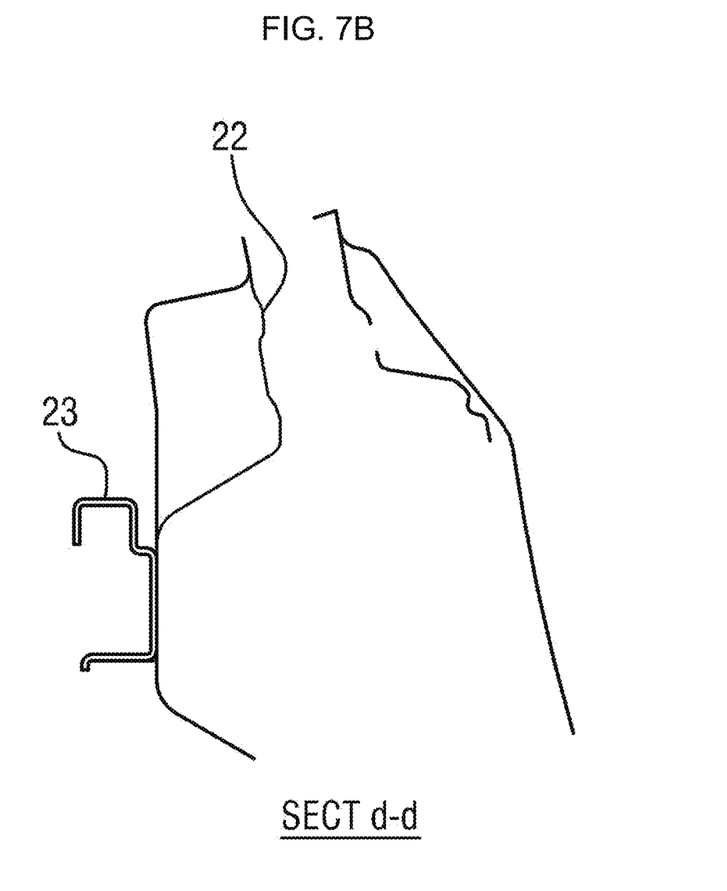
FIG. 7B is a cross-sectional view exemplarily illustrating section d-d in FIG. 7A.

FIG. 7A is an enlarged front view of portion C' in FIG. 2, and FIG. 7B is a cross-sectional view exemplarily illustrating section d-d in FIG. 7A.

Referring to FIG. 7, the internal belt rail 22 is also mounted on the door 1 while overlapping a mounted portion of the center rail 23, and as a result, it is possible to ensure rigidity of the mounted portion.

Figure 8A:
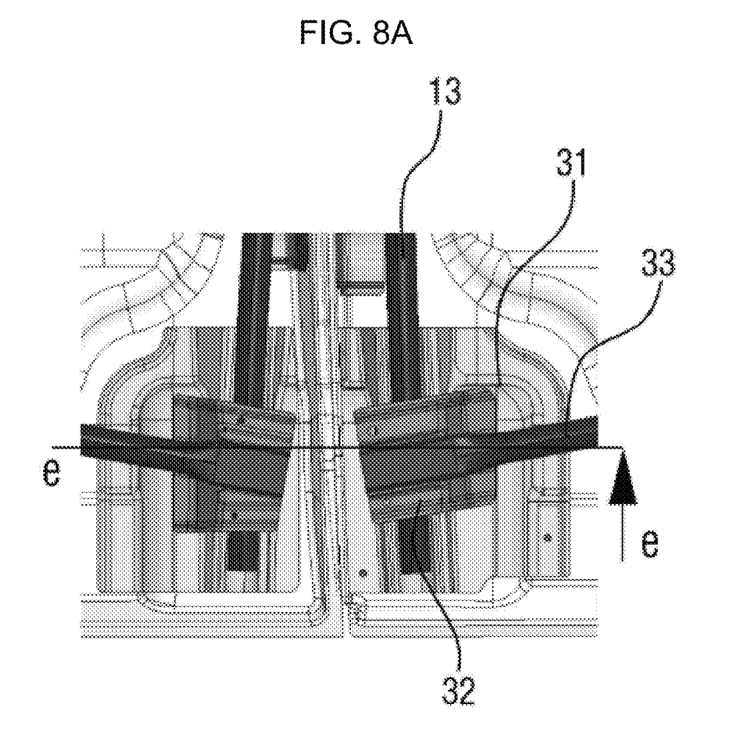
FIG. 8A is an enlarged front view of portion B' in FIG. 2.
Figure 8B:
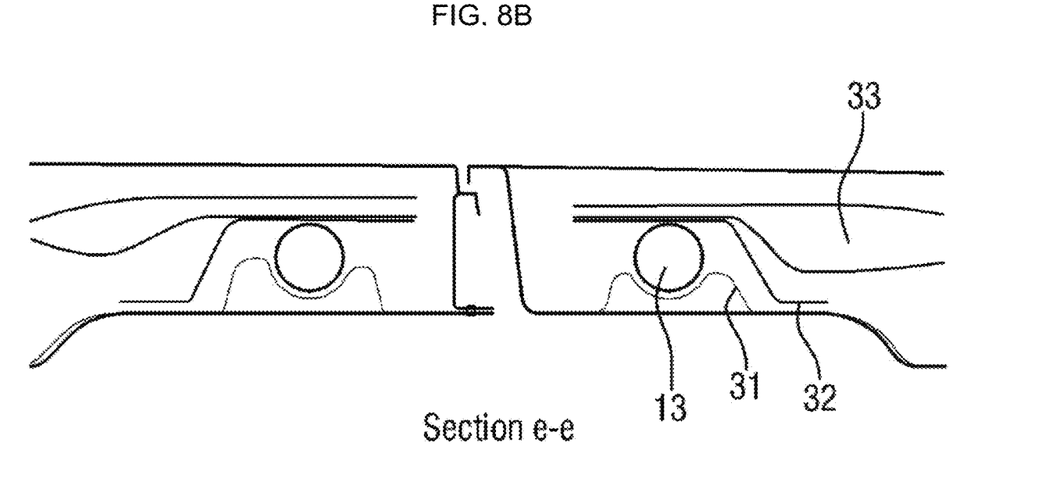
FIG. 8B is a cross-sectional view exemplarily illustrating section e-e in FIG. 8A.

FIG. 8A is an enlarged front view of portion B' in FIG. 2, and FIG. 8B is a cross-sectional view exemplarily illustrating section e-e in FIG. 8A.

The lower impact beam 33 may be formed such that the intersection portion 30 is compressed flat. Therefore, the lower impact beam 33 may be mounted on the door 1 in a state in which the lower impact beam 33 is in close contact with the lower bracket 32.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A rigidity reinforcing structure for B-pillarless opposite sliding doors, the rigidity reinforcing structure comprising:
    a column impact beam which is mounted in an up-down direction of a vehicle at a side of at least one of the doors to support the doors in the up-down direction of the vehicle;
    a center rail which is horizontally mounted at a center portion of the at least one of the doors to support the at least one of the doors in a front-rear direction of the vehicle; and
    a lower impact beam which is horizontally mounted at a lower side of the at least one of the doors to support the at least one of the doors in the front-rear direction,
    wherein an intersection portion is formed between the lower impact beam and the column impact beam, and
    wherein the lower impact beam has a first end portion where the intersection portion in which the lower impact beam and the column impact beam are intersected, is formed.

2. The rigidity reinforcing structure of claim 1, wherein the at least one of the doors is slidably mounted on the center rail to slide in the front-rear direction of the vehicle along the center rail.

3. The rigidity reinforcing structure of claim 2, wherein a first end portion of the center rail is coupled to a center bracket which is mounted on the at least one of the doors while overlapping a portion of the column impact beam between an upper portion and a lower portion of the column impact beam.

4. The rigidity reinforcing structure of claim 2, wherein a second end portion of the center rail is coupled to a roller which is mounted on a vehicle body to correspond to the center rail and allows the at least one of the doors to slide along the center rail while supporting the center rail.

5. The rigidity reinforcing structure of claim 1, further including:
    an upper bracket which is formed at an upper portion of the column impact beam to accommodate the upper portion of the column impact beam thereon and mounted on the at least one of the doors while overlapping the upper portion of the column impact beam.

6. The rigidity reinforcing structure of claim 5, wherein the upper bracket is coupled to an upper latch which is configured to lock or unlock the at least one of the doors and a vehicle body.

7. The rigidity reinforcing structure of claim 1, wherein the intersection portion includes:
    a lower column bracket which is formed to accommodate a lower portion of the column impact beam thereon and coupled to the at least one of the doors while overlapping the lower portion of the column impact beam; and
    a first lower bracket which is formed to accommodate the lower portion of the lower impact beam and coupled to the at least one of the doors while overlapping the first end portion of the lower impact beam.

8. The rigidity reinforcing structure of claim 7, wherein a second end portion of the lower impact beam is coupled to the at least one of the doors via a second lower bracket mounted between the second end portion of the lower impact beam and the at least one of the doors.

9. The rigidity reinforcing structure of claim 7, wherein the first end portion of the lower impact beam, the lower column bracket, the first lower bracket, and a lower portion of the column impact beam overlap one another at the intersection portion and are mounted on the at least one of the doors.

10. The rigidity reinforcing structure of claim 9, wherein the lower impact beam is formed below the center rail on the at least one of the doors.

11. The rigidity reinforcing structure of claim 10, wherein the lower impact beam is formed such that the intersection portion is compressed flat, and the first end portion of the lower impact beam is coupled to the first lower bracket.

12. The rigidity reinforcing structure of claim 1, further including:
- an internal belt rail which is horizontally mounted at a center portion of the at least one of the doors to support the at least one of the doors in the front-rear direction of the vehicle.

13. The rigidity reinforcing structure of claim 12, wherein the internal belt rail includes a first end portion which is bent in a first direction such that the first end portion of the internal belt rail is mounted on the at least one of the doors while overlapping the column impact beam and the center bracket.

14. The rigidity reinforcing structure of claim 13,
- wherein a second end portion of the internal belt rail is formed to be bent in a second direction and spaced from a surface of the at least one of the doors.

15. The rigidity reinforcing structure of claim 12,
- wherein the internal belt rail is mounted on the at least one of the doors while a first end portion of the internal belt rail overlaps a mounted portion of the center rail.

16. The rigidity reinforcing structure of claim 1, further includes a lower rail mounted at a lower portion of a vehicle body, wherein a lower roller mounted on a portion of the at least one of the doors is slidably engaged to the lower rail.

* * * * *